United States Patent [19]

Senior

[11] Patent Number: 4,891,084
[45] Date of Patent: Jan. 2, 1990

[54] METHOD OF MAKING A CURVED COMPOSITE ARTICLE

[75] Inventor: John M. Senior, Swindon, England

[73] Assignee: Raychem Limited, England

[21] Appl. No.: 287,586

[22] Filed: Dec. 14, 1988

Related U.S. Application Data

[63] Continuation of Ser. No. 21,863, Mar. 4, 1987, abandoned.

[30] Foreign Application Priority Data

Mar. 11, 1986 [GB] United Kingdom ................. 8605960

[51] Int. Cl.$^4$ .............................................. B32B 31/20
[52] U.S. Cl. ..................................... 156/196; 156/242; 156/245; 428/224; 428/284; 428/286; 428/287; 428/296; 428/411.1
[58] Field of Search ............... 156/196, 222, 223, 224, 156/242, 245, 288; 428/198, 224, 264, 284, 286, 287, 296, 411.1; 264/257, 258

[56] References Cited

U.S. PATENT DOCUMENTS

| | | | |
|---|---|---|---|
| 2,796,634 | 6/1957 | Chellis | 156/196 |
| 3,479,666 | 11/1969 | Webb | 156/245 |
| 4,302,499 | 11/1981 | Grisch | 428/287 |
| 4,506,269 | 3/1985 | Greene | 343/872 |
| 4,581,272 | 4/1986 | Walters et al. | 156/245 |
| 4,615,859 | 10/1986 | Traut | 264/570 |

FOREIGN PATENT DOCUMENTS

| | | |
|---|---|---|
| 155599 | 9/1985 | European Pat. Off. . |
| 1102033 | 3/1968 | United Kingdom . |
| 1136766 | 12/1968 | United Kingdom . |
| 1154208 | 6/1969 | United Kingdom . |
| 2070517 | 9/1981 | United Kingdom . |
| 2093767 | 9/1982 | United Kingdom . |
| 2105637 | 3/1983 | United Kingdom . |
| 2111429 | 6/1983 | United Kingdom . |
| 2116746 | 9/1983 | United Kingdom . |
| 2123744 | 2/1984 | United Kingdom . |
| 2125733 | 3/1984 | United Kingdom . |

OTHER PUBLICATIONS

WPI 85-238123/39 (abstract of EP 155,599).

Primary Examiner—Caleb Weston
Attorney, Agent, or Firm—Yuan Chao; Edith A. Rice; Herbert G. Burkard

[57] ABSTRACT

Curved composite articles, for example aeronautical radomes, are given a curved surface layer by consolidation under heat and pressure of a fusible polymeric fabric. Polyaryletherketone fabrics are preferred.

9 Claims, No Drawings

METHOD OF MAKING A CURVED COMPOSITE ARTICLE

This is a continuation of Ser. No. 021,863, filed 3/4/87, now abandoned.

This invention relates to curved composite articles and methods of making such articles.

It is known, for example from European Published Patent Application No. 155599, to make composite articles by stacking alternately layers of thermoplastics film material and layers of reinforcing fibres, placing a layer of erosion-resistant film on the outside, and subjecting the stack to heat to bond the layers together. However, this technique is tedious when applied to the production of curved composite articles, especially those of complex spheroidal curvature, since the film must be pre-formed to the curvature required, and it is difficult to control the uniformity and thickness of the resulting surface layer, especially when polymers of high melting temperature and high melt viscosity are used.

The present invention provides a simple and effective improvement in making curved composites, which is especially suitable for producing highly erosion-resistant surfaces.

The invention provides a composite article comprising (a) a curved body and (b) a curved surface layer formed by consolidation under heat and pressure of a fabric substantially completely composed of fusible polymeric material.

The use of a fabric to produce the surface layer according to the invention takes advantage of the desirable draping and "give" characteristics of a fabric to conform more easily and more accurately to a required complex curvature, especially aspherical, domed, hemispheroidal, or paraboloid, preferably hollow curvature, thus distributing the surface polymeric material more uniformly with less risk of the irregularities due to wrinkling, which can occur when polymer films are used. The fabric is preferably composed of fibres of the fusible polymeric material of diameter less than 150 micrometres, preferably less than 125 micrometres, more preferably less than 100 micrometres, and most preferably 75 micrometres or less.

Particularly useful composites are those wherein the body is fibre-reinforced and the surface layer is substantially fibre-free. Preferably, the surface layer is substantially unfilled. It is also preferred that the surface layer adhere to the body, preferably as an integral part of the composite article, although adhesive attachment of separately formed surface layers or loose fitting separately formed surface layers may be useful for some purposes.

The consolidation of the fabric to form the surface layer is preferably effected with the fabric in contact with the body, so that the consolidated fabric layer will adhere to the body. It is convenient to effect the consolidation during moulding of the curved body under heat and pressure.

The fabric may be woven, non-woven, knitted, or braided, and may comprise long monofilaments, chopped monofilaments, staple fibres, yarns made of such filaments or spun fibres, "tows", or filament-wound fibres. The configuration or arrangement of the fibres, filaments etc., in the fabric is not critical, provided that the desired distribution of the surface layer material is achieved. Woven fabrics are preferred. The fabric may advantageously be fashioned with a required curvature during its fabrication.

The fusible polymeric material of the fabric which forms the surface layer may be thermosetting or thermoplastic, the latter being preferred. Examples include nylons, aromatic polyamides, polyesters, aromatic polyesters, polyimides, and polyetherimides. Thermoplastic aromatic polymers are especially useful, preferably at least partly crystalline aromatic polymers such as poly(arylene ether), especially poly(aryletherketone).

It will be understood that references to aromatic polymers mean polymers which have arylene units incorporated in the repeating unit of their backbone chain, not merely appended as side groups to the chain as for example in the case of polystyrene. Preferably the aromatic polymer will have no two adjacent aliphatic carbon atoms in its backbone chain and preferably will be substantially free from aliphatic unsaturation. References to arylene groups being "interspersed" with various linkages are not intended to imply any particular regularity or pattern of interspersion, and do not exclude the presence of linkages other than those specifically stated to be present.

Preferred aromatic polymers are the poly(aryl ether) resins which may be described as linear, thermoplastic polymers having the repeat unit of the formula $$-\text{X}-\text{Ar}-\text{Y}-\text{Ar}'-$$

wherein Ar and Ar' are divalent aromatic moieties bonded to X and Y through aromatic carbon atoms and wherein X and Y are independently carbonyl, sulphone, ether, or thioether, with the proviso that at least one of X and Y is ether.

Preferably Ar and Ar' are independently selected from substituted and unsubstituted phenylene and substituted and unsubstituted polynuclear aromatic moieties. The term "polynuclear aromatic moieties" is used to mean aromatic moieties containing at least two aromatic rings, which can be fused or joined by a direct bond or a linking group. Such linking groups include, for example, carbonyl, ether, sulphone, thioether, amide, imide, phenoxy, azo, alkylene, perfluoroalkylene, carbonate, and the like.

The polyarylene polyethers may be prepared by methods well known in the art, for instance the substantially equimolar one-step reaction of a double alkali metal salt of dihydric phenol with a dihalobenzenoid compound in the presence of specific liquid organic sulphoxide or sulphone solvents under substantially anhydrous conditions. Catalysts are not necessary for this reaction.

The polymers may also be prepared in a two-step process in which a dihydric phenol is first converted in situ in the primary reaction solvent to the alkali metal salt by the reaction with the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salt of the dihydric phenol is admixed and reacted with about stoichiometric quantities of the dihalobenzenoid or dinitrobenzenoid compound.

The polymerization reaction proceeds in the liquid phase of a sulphoxide or sulphone organic solvent at elevated temperatures.

Poly(arylene ethers) having the following repeat units (the simplest repeat unit being designated for a given polymer) are preferred, "Ph" representing a p-phenylene moiety:

(A) —O—Ph—O—Ph—CO—Ph—
(B) —O—Ph—SO$_2$—Ph—
(C) —O—Ph—CO—Ph—
(D) —O—Ph—C(CH$_3$)$_2$—Ph—O—Ph—SO$_2$—Ph—

These repeat units can be named in various ways, for example (C) poly(carbonyl-p-phenylene-p-oxyphenylene).
(A) poly(carbonyl-p-phenylene-p-oxyphenylene-p-oxyphenylene).
(B) poly(sulphonyl-p-phenylene-p-oxyphenylene).
(D) poly(sulphonyl-p-phenylene-p-oxyphenylene-p-isopropylidene phenylene-p-oxyphenylene).

The term "aromatic ether ketone polymer" or "polyaryletherketone" is used herein to include polymers containing arylene, ether and ketone linkages in the polymer chain. Other linking groups such as sulphone, thioether, amide, imide, azo, alkylene, perfluoroalkylene, carbonate or the like may also be present. By analogy the term "aromatic ether sulphone polymer" or "polyarylethersulphone" is used herein to include polymers containing arylene, ether and sulphone linkages in the polymer chain. Other linkages such as carbonyl and those listed above may also be present. Polyarylene sulphides such as "RYTON" (Trade Mark) may also be suitable for the present invention.

The polyaryletherketones may be better defined as polymers having the repeat unit of the formula

—CO—Ar—CO—Ar'— wherein Ar and Ar' are aromatic moieties at least one of which contains a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieties is as hereinbefore defined.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units (the simplest repeat unit being designated for a given polymer) are preferred, "Ph" representing a p-phenylene moiety:

(I) —Ph—O—Ph—CO
(II) —Ph—O—Ph—O—Ph—CO—Ph—CO—
(III) —Ph—O—Ph—CO—Ph—O—Ph—CO—PH—CO—
(IV) —Ph—O—Ph—O—Ph—CO—Ph—O—Ph—CO—
(V) —Ph—O—Ph—O—Ph—CO—
(VI) —Ph—O—Ph—CO—Ph—CO—

The polymers having repeat units (I), (II), (III) and IV above are especially preferred where high temperature performance and raindrop impact erosion resistance are desired.

Poly(aryl ether ketones) can be prepared by known methods of synthesis. Preferred poly(aryl ether ketones), which are advantageous for forming the fabrics used in this invention, can be prepared by a special Friedel-Crafts polymerization as described in our published European Patent application No. 124276.

In this process, a single monomer system comprising an aromatic acid halide having an acid halide group and an aromatic hydrogen atom activated toward electrophilic attack or a two-monomer system comprising an aromatic diacid dihalide and an aromatic compound having two aromatic hydrogen atoms activated to electrophilic attack is polymerized in a reaction medium comprising a Lewis acid, optionally a controlling agent such as a Lewis base, and optionally a diluent. Preferably, a Lewis base is present in the reaction medium, in which case, the amount of Lewis acid employed should be in excess of that required to complex with the Lewis base and all other basic species in the reaction mixture. If a Lewis base is not present, the amount of Lewis acid used depends on the nature of the particular monomer system used. If the monomer system contains deactivated aryloxy groups then a substantial excess of Lewis acid over that required to complex with the basic species present should be used. If the monomer system contains undeactivated aryloxy groups, only a slight excess of Lewis acid over that required to complex with the basic species present should be used. Further, if no Lewis base is used, a diluent should be present in the reaction mixture and the concentration of the monomer(s) should be above a certain level. The process provides high molecular weight, melt processable poly(arylene ether ketones) with little, if any, undesired substitution along the polymer backbone. This absence of undesired substitution makes the polymers especially suitable for making low diameter fibres for use in the fabrics of the present invention. Polyaryletherketones having less than 0.1%, preferably less than 0.01% ortho—branching of p-phenylene chain units are preferred, substantially gel-free, melt-stable polyaryletherketones being most suitable.

The use of thermoplastic polymer rather than thermosetting polymer is preferred for many applications for a variety of reasons. In particular thermoplastic polymer based composites may be postformed, that is once consolidated they may be reheated above the melting temperature of the thermoplastic and deformed to change the shape of the composite. This allows the composites to be made in shapes that are easy to manufacture and/or store and/or transport, the shapes being postformed later to the shape required for operation. For example thermoplastic composites may be made as flat plates and postformed into curved plates as may be required, for example, for body panels for vehicles or aircraft. Also thermoplastics may be used which have high tensile and bending strength, high toughness, rain erosion resistance and abrasion resistance. Furthermore thermoplastic materials are typically easier to handle and fabricate into composite structures than thermosetting materials since at manufacturing temperatures the surface of some thermosetting materials tends to be "tacky", while that of a thermoplastic material is "dry".

The body may comprise polymeric material, e.g. substantially amorphous aromatic polymer, and fibre reinforcement, the reinforcing fibres preferably being provided by one or more fabric layers, for example, weaves, braids or knits. The fibres of the fabric may be provided as single fibres, or in bundles of fibres commonly known as "tows". As other examples the fibre reinforcement may be provided by short lengths of fibres, for example as short chopped fibres or staple fibres, or by filament wound fibres.

The material of the fibre reinforcement is preferably compatible with the body polymeric material, and the fibre reinforcemnt is preferably incorporated in the polymeric material at a sufficiently high density to provide structural strength to the composite. As examples of fibres that may be used there may be mentioned carbon, glass, boron, alumina, silicon carbide, and silica fibre, natural fibres such as cotton, organic fibres such as nylon polyesters and polyamides, and metallic fibres such as stainless steel and aluminium. A single type of fibre may be used or a combination of different types of fibre. Also where a fibre comprises a bundle of filaments in a so-called 'tow' or 'roving' the filaments in each tow or roving may be the same or different. Thus for example a mixed tow may comprise a bundle of both organic and inorganic filaments. As examples, in some embodiments, it is preferred for at least some of the fibres to be metal, for example where the composite is to be used for electromagnetic shielding. In other embodiments it is preferred to use electrically non-conductive fibres, for example glass fibres, to prepare composites having an acceptable degree of "transparency" to electromagnetic radiation, for which purpose the body polymer may also be selected to have such "transparency", e.g. a poly(amide/imide). Such composites may be used to provide radomes (radar antenna housings) or other aeronautical components or housings (e.g. nacelles) for supersonic aircraft or missiles. It is an advantage of the present invention that a thin uniform surface layer of the possibly less "transparent" poly(aryletherketone) can thus be provided for desirable high temperature and raindrop erosion resistance on a structurally strong body of high "transparency".

The softening temperature of the fibres of the body reinforcement is preferably greater than the softening temperature of the body polymeric material. The difference between the softening temperatures is preferably at least 50° C.

The fibre reinforcement and the polymeric material of the body may be provided in a variety of substantially unconsolidated arrangements, by which is meant that the individual fibres, or groups of individual fibres (especially tows), are not joined together by the polymeric material to any significant extent. Consolidation causes the polymeric material to spread out and join the fibres together. In one embodiment a fibre reinforcement and the body polymeric material are provided as discrete layers. Alternatively the fibre reinforcement may be embedded or dispersed in the body polymeric material in advance.

In a further embodiment, a fibrous layer with its own integrity is used, for example a fabric layer. The body polymeric material may be provided as a coating or an impregnation of the fibres of the reinforcement. Where a fabric is used the fibres may be coated or impregnated with the body polymeric material before they are made into a fabric, or the fabric may be made first and then the finished fabric coated or impregnated with the polymeric material.

Where the fibres are pre-impregnated or precoated, a single type of impregnation/coating may be used on all of the fibres or a different type of impregnation/coating may be used on different fibres.

Where a curable polymeric material is used, first and second curable components may be provided as coatings or impregnations on different fibres or as overlying coatings on a single fibre. As examples, there may be used in the present invention the curable components and the fibres and fabrics described in U.K. Patent Application Publication Nos. 2135673, 2139227 and 2139228, and European Published Application No. 0117738.

The invention also provides a method of making a composite article according to any of the preceding with the said body or an assembly which can be consolidated to form the body, and applying heat and pressure to consolidate the fabric and produce the said surface layer.

Appropriate heat and pressure for the consolidation of the fabric to form the surface layer of a composite of desired, curvature can readily be determined by simple trial and error, pressures of 1 to 10 $MN/m^2$ at 370°–420° C., for example, being suitable for shaping and consolidating an arrangement of 1 to 10 layers of polyaryletherketone fabric on a body of up to 50 or more layers of a glass-reinforced poly(amide/imide).

Preferably, the body and fabric are shaped to the required curvature during the consolidation. The body may be provided by an assembly of polymeric material and reinforcing fibres which is consolidated to form the body during the consolidation of the fabric which forms the surface layer.

Specific examples of the invention will now be described by way of further illustration, using as the fusible polymeric a thermoplastic polyaryletherketone having the repeat unit (I) hereinbefore listed, identified in these examples as PEK.

EXAMPLE 1—One-Step Preparation of Curved Composite

Glass cloth (heat-cleaned 1581 grade E glass 8-end satin) was coated with a polyamide-imide polymer (Torlon 4000TF) from solution in N-methyl pyrrolidone to a dried resin content of 22% by weight.

PEK cloth (3/1 broken twill, warp 48 end/inch, weft 28 end/inch) was made from PEK fibre (22 filament 107 Tex twisted yarn).

A sandwich construction of 2 PEK cloths, 63 sheets of Torlon-coated glass cloth, and 2 more PEK cloths, laid up in an alternating 0°, 90° fashion, each sheet being 26.5 cmsquare, was consolidated between aluminium release foils in a curved steel mould at 380° C. under a force of 40 tons. This pressure was applied for 10 mins once the sandwich had reached 380° C. After cooling to room temperature under pressure, the composite was removed from the press and the aluminium foil peeled off.

The product was a composite of complex hollow curvature and of total thickness 12.1 mm, consisting of 11.1 mm of Torlon/glass between two strongly adhering 0.5 mm layers of PEK. The Torlon/glass layer was free of voids, and the PEK layer likewise had melted to form a void-free layer.

EXAMPLE 2—Two-Step Preparation of Curved Composite

The above materials and consolidation technique were employed except that the Torlon/glass cloth was consolidated alone, removed from the mould, sandwiched between PEK cloths, then replaced in the mould, and heat and pressure applied to melt the PEK. The product was similar to that produced in Example 1.

EXAMPLE 3

A cloth was made from PEK fibre (22 filament 107 Tex twisted yarn) and glass fibre (Vetrotex EC9 68ZX2 AS21P S80). The weave construction was an 8-end sateen, warp PEK 48 end/inch, weft glass 30 end/inch.

A cloth of PEK alone was also made, a 3/1 broken twill, warp 48 end/inch, weft 28 end/inch.

A sandwich construction of 2 layers of PEK cloth, 4 layers of PEK/glass cloth, and 2 more layers of PEK cloth, laid up in an alternating 0°, 90° fashion, each cloth being 16 cm square, was consolidated between aluminium release foils in a curved steel mould at 400° C. under a force of 10 tons. This pressure was applied for 15 mins once the sandwich had reached 400° C. After cooling to room temperature under pressure, the composite was removed from the press and the aluminium foil peeled off.

The product was a composite of complex hollow curvature and of thickness 1.5 mm containing well wettedout glass fibres and having smooth fibre-free surfaces (due to the two surface layers of glass-free PEK cloth).

I claim:

1. A method of making a composite article comprising (a) a curved body reinforced with a fiber reinforcement and (b) a substantially fiber-free curved surface layer formed by fusion and consolidation under heat and pressure of a fabric substantially composed of poly(aryl ether ketone) fibers of diameter less than 150 micrometers, the poly(aryl ether ketone) fibers having a softening temperature at least 50° C. lower than the softening temperature of the fiber reinforcement; comprising placing the said fabric in contact with the said body or an assembly which can be consolidated to form the said body, and applying heat and pressure to fuse and consolidate the fabric and produce the said surface layer.

2. A method according to claim 1, wherein the fabric was a woven fabric.

3. A method according to claim 1, wherein the poly(aryletherketone) has a repeat unit $$-Ph-O-Ph-CO- \qquad (I)$$

or $$-Ph-O-Ph-O-Ph-CO-Ph-CO- \qquad (II)$$

or $$-Ph-O-Ph-CO-Ph-O-Ph-CO-Ph-CO- \qquad (III)$$

or $$Ph-O-Ph-O-Ph-CO-Ph-O-Ph-CO- \qquad (IV)$$

wherein Ph represents a p-phenylene moiety.

4. A method according to claim 1, wherein the body and fabric are shaped to the required curvature during the consolidation.

5. A method according to claim 1, wherein the body is provided by an assembly of polymeric material and reinforcing fibres which assembly is consolidated to form the body during the consolidation of the said fabric.

6. A method according to claim 1, wherein the body comprises a composite of polymeric material and reinforcing fibres.

7. A method according to claim 6, wherein the body comprise glass reinforcing fibres.

8. A method according to claim 6, wherein the body polymeric material amorphous aromatic polymer.

9. A method according to claim 6, wherein the body polymeric material comprises poly(amide/imide).

* * * * *